United States Patent
Otsuka et al.

(10) Patent No.: US 8,427,090 B2
(45) Date of Patent: Apr. 23, 2013

(54) MAGNETIC-DRIVE-PULSATION MOTOR

(75) Inventors: Nobuyuki Otsuka, Kyoto (JP); Yuji Kudoh, Kyoto (JP); Daisuke Ueda, Kyoto (JP); Hitoshi Taya, Aichi (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/247,197

(22) Filed: Sep. 28, 2011

(65) Prior Publication Data
US 2012/0019182 A1    Jan. 26, 2012

Related U.S. Application Data
(63) Continuation of application No. PCT/JP2011/001096, filed on Feb. 25, 2011.

(30) Foreign Application Priority Data
Mar. 3, 2010 (JP) ................................ 2010-046192

(51) Int. Cl.
    H02K 29/06   (2006.01)
(52) U.S. Cl.
    USPC ............. 318/400.23; 318/400.01; 318/700; 310/103; 310/112; 310/113
(58) Field of Classification Search ........... 318/400.01, 318/400.23, 700; 310/113, 112, 68 B
    See application file for complete search history.

(56) References Cited

U.S. PATENT DOCUMENTS
| | | | |
|---|---|---|---|
| 4,551,658 A | 11/1985 | Rhee | |
| 6,713,981 B2 * | 3/2004 | Nakajima | ............ 318/491 |
| 2003/0071533 A1 | 4/2003 | Kikuchi et al. | |
| 2004/0021390 A1 * | 2/2004 | Kim et al. | ............ 310/191 |
| 2006/0226719 A1 * | 10/2006 | Nakanishi et al. | ........ 310/68 B |
| 2007/0013262 A1 * | 1/2007 | Okumoto et al. | ........... 310/263 |
| 2007/0090707 A1 * | 4/2007 | Moriya et al. | ............. 310/113 |
| 2007/0145838 A1 * | 6/2007 | Uchitani et al. | ......... 310/68 B |
| 2007/0216245 A1 * | 9/2007 | Fielder | ...................... 310/102 R |
| 2007/0216248 A1 * | 9/2007 | Han et al. | ..................... 310/114 |
| 2009/0160285 A1 | 6/2009 | Kikuchi et al. | |
| 2009/0273251 A1 * | 11/2009 | Cordes et al. | ................ 310/112 |

FOREIGN PATENT DOCUMENTS
| | | |
|---|---|---|
| JP | 58-107086 | 6/1983 |
| JP | 59-21262 | 2/1984 |
| JP | 2001-505507 | 4/2001 |
| JP | 2002-320371 | 10/2002 |
| JP | 2004-56887 | 2/2004 |
| JP | 2005-160257 | 6/2005 |
| JP | 2009-153307 | 7/2009 |

OTHER PUBLICATIONS
International Search Report issued Apr. 5, 2011 in International Application No. PCT/JP2011/001096.

* cited by examiner

*Primary Examiner* — Kawing Chan
(74) *Attorney, Agent, or Firm* — Wenderoth, Lind & Ponack, L.L.P.

(57) ABSTRACT

To develop a motor which can directly drive a brushless motor using a conventional circuit for an inverter without smoothing circuit and a circuit for a matrix converter that are for a brushed motor that operates on single-phase 100 V. Magnetic cores are attached to a motor shaft to increase inertial force. A magnetic-drive-pulsation motor which modulates torque is realized using force of attraction and repulsion generated by outer magnets and magnetic cores. The magnetic-drive-pulsation motor can be driven using the inverter and the matrix converter on single-phase 100 V power supply.

9 Claims, 13 Drawing Sheets

Cross-section view of pulsator unit

MAGNETIC-DRIVE-PULSATION MOTOR

CROSS REFERENCE TO RELATED APPLICATION

This is a continuation application of PCT application No. PCT/JP2011/001096 filed on Feb. 25, 2011, designating the United States of America.

BACKGROUND OF THE INVENTION (1) Field of the Invention

The present invention relates to motors driven using inverters without smoothing circuit and matrix converters, and particularly to a rotary drive mechanism of a motor which shows no pulsation caused by reduced rotations and reduced torque of the motor even when the motor is driven on a single-phase 100 V used in typical household.

(2) Description of the Related Art

FIG. 7A and FIG. 7B show voltage waveforms that show relationship between voltage and time on single-phase power supply and three-phase power supply. In FIG. 7A and FIG. 7B, a vertical axis represents the voltage and a horizontal axis represents the time.

In the case of three-phase power supply shown in FIG. 7A, each of three phases has phase difference of 120 degrees with respect to the other phases. For example in Japan, three phases vary in the range from −140 V to +140 V at 50 Hz or 60 Hz.

As shown in FIG. 7A, in the case of three-phase power supply, a matrix converter can provide −140 Vp with a fluctuation of 15% or less as well as +140 Vp having a fluctuation of 15% or less by selecting an envelope having the largest voltage. Here, the Vp indicates a half of a voltage value which is a width between a maximum value and a minimum value in a voltage waveform. Thus, a direct-current component having a little pulsation can be obtained by switching the phases as necessary, and smoothing by a capacitor is not required.

In single-phase power supply, there are two phases each having a 180-degree phase difference with respect to each other. As shown in FIG. 7B, selecting a voltage envelope cannot eliminate a zero crossing. As a result, even with the matrix converter, voltage reaches 0 V at every half cycle of 50 Hz or 60 Hz unless smoothing by a capacitor is performed, causing a problem of pulsation caused by reduced rotations and reduced torque of a motor.

Meanwhile, to achieve downsizing of inverters, inverters without smoothing circuit that have smaller smoothing capacitors are beginning to be used. When single-phase 100 V power supply provided to typical households is used, sufficient smoothing is not performed by the capacitor. Thus, the voltage output after diode rectification is not a direct-current component, leading to a problem of generation of large pulsation.

In other words, since an alternating-current component is outputted as it is, output voltage approaches 0 V at every half cycle of 50 Hz or 60 Hz. This poses a problem of not only noise in audible field and vibration but also pulsation caused by reduced rotations and reduced torque of a motor. In addition, there is a problem that motor can stop running.

In view of the above, there is a demand for motors which continuously rotate even when the output voltage becomes 0 V at every half cycle of 50 Hz or 60 Hz.

In related art, there is a Permanent Magnet synchronous motor (PM synchronous motor) in which variation in number of rotations is suppressed (Patent Reference 1: Japanese Unexamined Patent Application Publication No. 2002-320371).

As shown in FIG. 5, when three-phase alternating-current power supply is used, a capacitor is not necessary, energy efficiency is high, variation in torque is small and thus vibration is not generated. Thus, an objective is to provide a PM synchronous motor 51 which is suitable for low speed rotation maintaining the same number of rotations, even when variation in a voltage or a load occurs, and can be used on both direct current (DC) power supply and alternating-current (AC) power supply.

To suppress variation in number of rotations, the PM synchronous motor 51 includes: a rotor 52 which includes a permanent magnet 52c; and three stators 53 each of which includes a solenoid coil 53a that is interposed between the two yokes 53b and 53c that include pole teeth 53d and 53e. The three stators 53 each having an electrical phase angle shifted by 120 degrees are disposed on an outer circumference of the rotor 52. A control device that includes a three-phase full-wave driver, a control signal generator and an oscillator which includes variable unit is formed, and a rotary drive mechanism driven on the DC power supply is thus provided. Further, the rotary drive mechanism includes a control device which performs control using three-phase AC power supply in which a frequency of the PM synchronous motor 51 is variable.

FIG. 6 describes an embodiment of a single-phase/three-phase conversion device (matrix converter) (Patent Reference 2: Japanese Unexamined Patent Application Publication No. 2005-160257). An objective of this embodiment is to provide a control device for a single-phase/three-phase conversion device such that pulsation generated by single-phase instantaneous power can be compensated.

An AC power storage circuit PS for storing AC power is provided between three connection points P1 to P3 in three series switching circuits and a common connection point CP2. The power storage circuit PS stores a pulsation component of single-phase AC power. The AC power storage circuit PS that includes an AC reactor $L_s$, which is disposed between three connection points P1 to P3 in three series switching circuits and the common connection point CP2, and a switching circuit SWC is formed.

The switching circuit SWC selectively connects the AC reactor $L_s$ to one of the three connection points P1 to P3 in three series switching circuits such that all the pulsation components of single-phase AC power are converted into instantaneous power that is provided to the AC reactor L. Although this embodiment allows single-phase driving, a smoothing capacitor and three reactors are required.

SUMMARY OF THE INVENTION

It is assumed that a Permanent Magnet synchronous motor (PM synchronous motor) is used on three-phase AC power supply that does not contain a problem of zero-crossing. Thus, a motor which does not generate pulsation, which is caused by reduced rotations and reduced torque of a motor, and keeps rotating, even when the output voltage becomes 0 V at every half cycle of 50 Hz or 60 Hz is required. While a use of a power storage circuit enables to store and suppress pulsation component, an inverter or a matrix converter needs to include an additional smoothing capacitor and a reactor, or the power storage circuit. Thus, significant modification of circuit is necessary to directly drive a brushless motor using a conventional inverter circuit or a matrix converter circuit that are for a brushed motor.

According to the present invention, a PM synchronous motor unit and a pulsator unit are disposed within a same stator. The PM synchronous motor unit and the pulsator unit are connected together by a same shaft. The pulsator unit includes two outer magnets each having a different polarity that are disposed to face each other; and two magnetic cores each having a different polarity that are attached to the shaft shared with the motor. The arrangement is made such that magnetic fields of the outer magnets and the magnetic cores are coupled with each other. The pulsator unit modulates torque using external magnetism generated by the disposed magnets to enable a continuous driving of the motor even when a driving voltage drops to 0V. In addition, the pulsator unit includes two outer solenoids that are disposed to face each other. The solenoids are electrically connected to cause an induced current to flow, and torque is generated such that a change in a magnetic field within the solenoids is suppressed. In this way, the outer magnets are eliminated. Further, conduction state of the outer solenoids is changed using a switch to realize a low loss driving in which a loss is zero at other timings than a zero crossing.

According to the present invention, the problem of pulsation caused by reduced rotations and reduced torque of the motor is eliminated even when using an inverter without smoothing circuit and the matrix converter using a single-phase, 100 V power supply, and the motor can be driven using a simple control device.

In other words, although the inverter without smoothing circuit and the matrix converter circuit have not been used on a single-phase due to the problem of zero-crossing, a Magnetic-drive-Pulsation motor (MP motor) according to the present invention enables the motor to drive on a single-phase AC power supply using the inverter without smoothing circuit and the matrix converter. Furthermore, a change is not made to a circuit portion but to a motor itself. Thus, the conventional inverter without smoothing circuit and the matrix converter, which are for the brushed motor, can be used as they are to drive the brushless motor. According to the present invention, the motor portion is replaced, mitigating the size of a change in a driving portion. This allows a replacement from a brushed motor in a conventional device to a brushless motor to be easy.

FURTHER INFORMATION ABOUT TECHNICAL BACKGROUND TO THIS APPLICATION

The disclosure of Japanese Patent Application No. 2010-046192 filed on Mar. 3, 2010 including specification, drawings and claims is incorporated herein by reference in its entirety.

The disclosure of PCT application No. PCT/JP2011/001096 filed on Feb. 25, 2011, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENTS

First, following describes how inventors of the present invention conceived the present invention, and then describes embodiments.

When an inverter without smoothing circuit and a matrix converter were used to drive a compressor for an air conditioner and a refrigerator on single-phase 100 V, stable rotation of a motor was achieved. Even when a zero-crossing occurs, pulsation caused by reduced rotations or reduced torque of a motor was not observed. In contrast, the inventors of the present invention have found that a device such as a ventilating fan that includes no compressor shows unstable rotation and pulsation caused by reduced rotations and reduced torque of a motor. Especially, there is a problem that the motor itself begins to vibrate significantly at 1000 rpm or higher.

From the above, inventors of the present invention learnt that when a motor connected to a compressor is driven, motor rotates without significant pulsation even on the single-phase 100 V in which zero-crossing occurs.

The compressor has large inertial force and modulated torque. Thus, the inventors of the present invention thought that, by providing the inertia and torque modulation mechanism to the motor, it may be possible to drive the motor stably using the inverter without smoothing circuit and the matrix converter on the single-phase 100 V without connecting a compressor.

If the compressor is simply connected, compression and expansion of gases such as a chlorofluorocarbon are mechanically performed. Thus, the structure of the compressor is very complicated. Furthermore, because of the heavy weight, there is a problem in connecting a mechanism of the compressor to small light-weighted motors that are for the ventilating fan or the like.

In view of the above, to achieve the same effect as the compressor, magnetic cores are attached to a shaft of the motor to increase inertial force. The modulation of torque is achieved through attraction and repulsion generated between outer magnets and the magnetic cores. Following describes with reference to drawings a Magnetic-drive-Pulsation motor (MP motor) that is driven by the inverter and the matrix converter on the single-phase power supply.

Embodiment 1

Figure 1A:
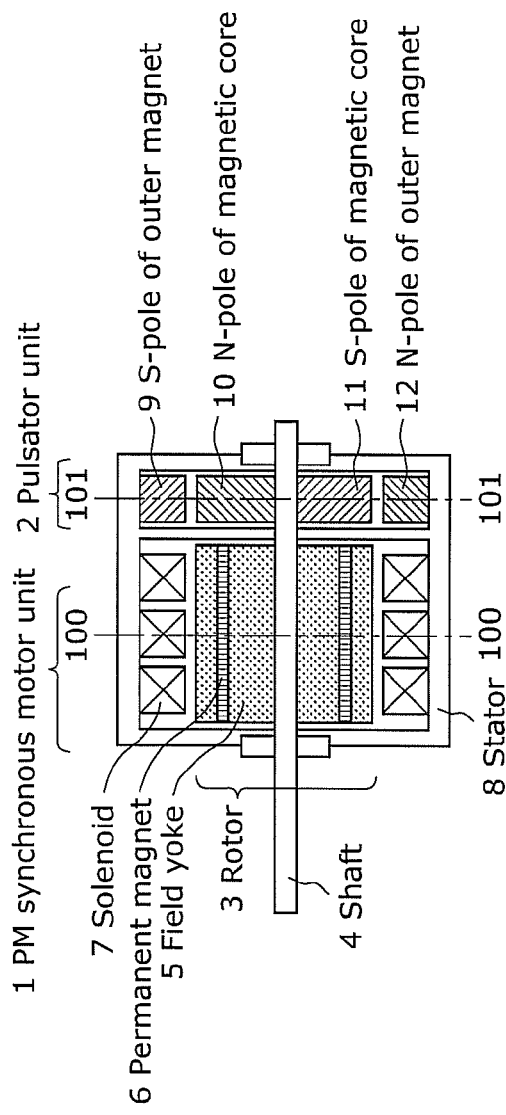
FIG. 1A to FIG. 1D are cross-section views of a magnetic-drive-pulsation motor according to Embodiment 1 of the present invention.

Following describes a magnetic-drive-pulsation motor according to Embodiment 1 with reference to FIG. 1A to FIG.

1D. As shown in FIG. 1A, the magnetic-drive-pulsation motor according to Embodiment 1 includes a PM synchronous motor unit 1 and a pulsator unit 2. Shown in FIG. 1A is a cutting plane showing a plane parallel to a rotary shaft of the magnetic-drive-pulsation motor.

(PM Synchronous Motor Unit 1)

Figure 1B:
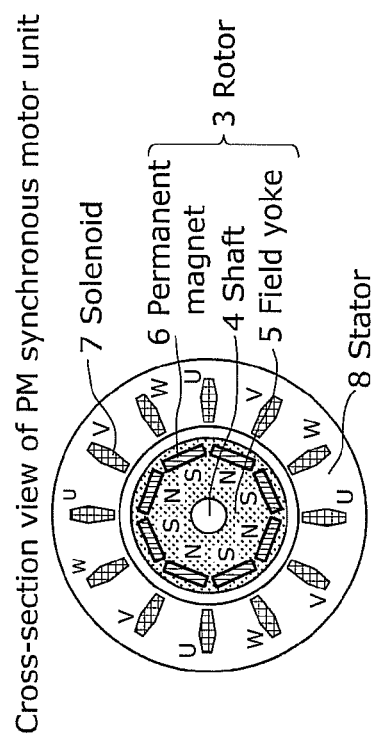

FIG. 1B is a cutting plane of a PM synchronous motor unit 1 taken along the dashed-dotted line 100 shown in FIG. 1A. The PM synchronous motor unit 1 includes: a rotor 3; a stator 8 that is attached such that the stator 8 is in contact with an outer circumference of the rotor 3; and solenoids 7. The PM synchronous motor unit 1 shown in FIG. 1B has a 12 slots-8 poles structure. The 12 slots indicate the number of the solenoids 7, and the 8 poles indicate the number of permanent magnets 6.

Following describes each component of the PM synchronous motor unit 1. The rotor 3 includes a shaft 4, a field yoke 5, and the permanent magnets 6.

The field yoke 5 is disposed so as to surround the shaft 4. Furthermore, the permanent magnets 6 are embedded in the field yoke 5, and are disposed on a circumference of the rotary shaft of the shaft 4. The permanent magnets 6 are embedded in the field yoke 5 so that magnets are less likely to be broken with a rotation. As shown in FIG. 1B, a permanent magnet having a north magnetic pole (N-pole) and a permanent magnet having a south magnetic pole (S-pole) are alternately arranged. As shown in FIG. 1B, the rotor 3 having the permanent magnets 6 on its outer circumference can freely rotate centering the shaft 4.

The solenoids 7 are disposed inside the stator 8 such that the solenoids 7 are arranged at even intervals in the circumference direction of the stator 8. Furthermore, the solenoids 7 are arranged in positions that face the permanent magnets 6.

The stator 8 includes the shaft 4 which is disposed so as to pass through an inside of the stator 8. The stator 8 is, for example, in a circular cylindrical shape.

(Pulsator Unit 2)

Figure 1C:
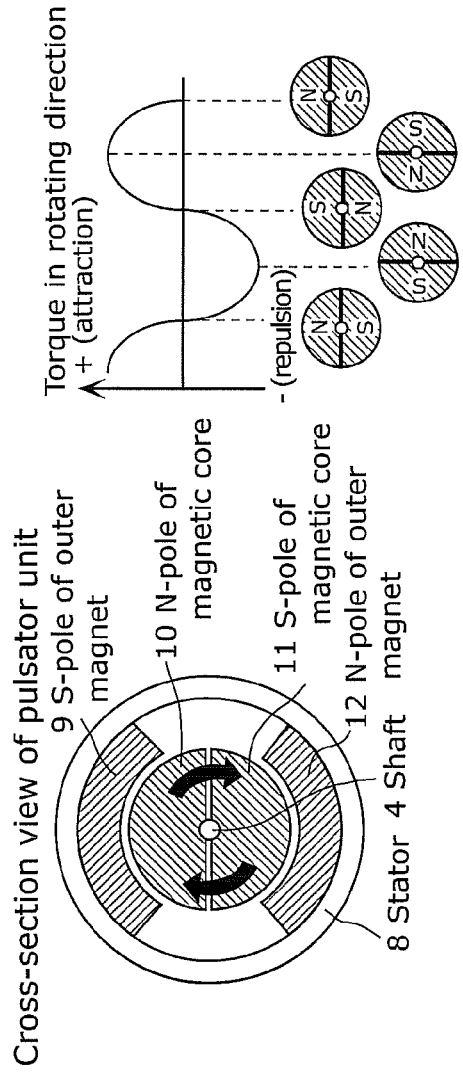

Following describes the pulsator unit 2 with reference to FIG. 1C which illustrates a cutting plane taken along a dashed-dotted line 101 shown in FIG. 1A. As shown in FIG. 1C, the pulsator unit 2 includes magnetic cores that are disposed so as to surround the shaft 4. The magnetic cores are formed by an N-pole of magnetic core 10 and an S-pole of magnetic core 11. The N-pole of magnetic core 10 and the S-pole of magnetic core 11 are fixed to the shaft 4, and rotate as the rotor 3 rotates.

An S-pole of outer magnet 9 and an N-pole of outer magnet 12 (outer magnets) are arranged and fixed at positions that face the magnetic cores so as to surround the N-pole of magnetic core 10 and the S-pole of magnetic core 11. The outer magnets surround the magnetic cores in a range of an angle of approximately 90 degrees with respect to the shaft.

The outer magnets are disposed such that shaft sides of the outer magnets are S-pole and N-pole respectively. The S-pole of outer magnet 9 and the N-pole of outer magnet 12 are disposed in the stator 8.

Figure 1D:
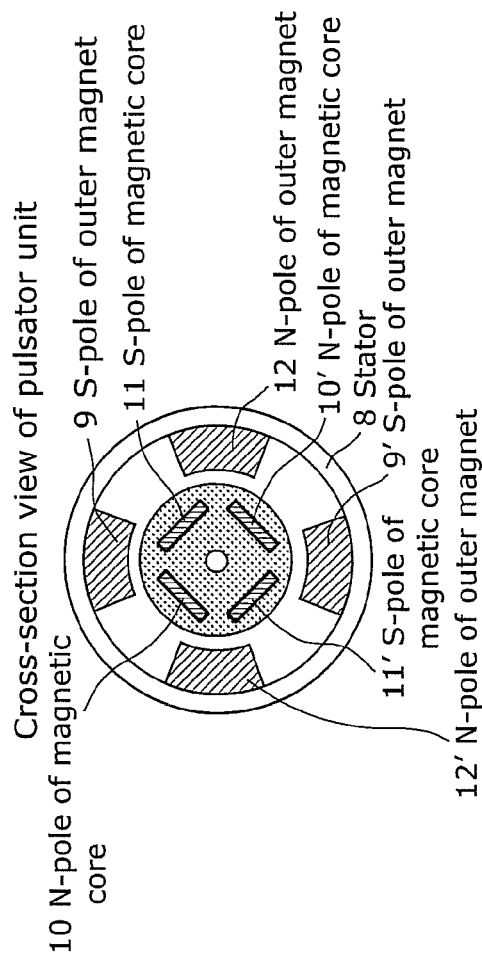

It is to be noted that although outer magnets described above are disposed in the range of the angle of approximately 90 degrees with respect to the shaft, a plurality of smaller outer magnets may be disposed as shown in FIG. 1D as long as sufficient torque is generated. In this embodiment, an S-pole of outer magnet 9' is disposed at the position that faces the S-pole of outer magnet 9, and an N-pole of outer magnet 12' is disposed at the position that faces the N-pole of outer magnet 12. Each of magnets is in a size having an angle of approximately 30 degrees with respect to the shaft. The number of poles of the magnetic cores corresponds with the outer magnets. More specifically, an N-pole of magnetic core 10' is disposed at the position that faces the N-pole of magnetic core 10, and an S-pole of magnetic core 11' is disposed at the position that faces the S-pole of magnetic core 11.

For example, here, neodymium magnets are used and magnetic density between the magnetic cores and the outer magnets is 0.5 tesla (T). The magnetic cores having a diameter of 80 mm and thickness of 5 mm are used. The weight of the magnetic cores is about 190 g, providing inertial force to the shaft 4.

When the solenoids 7 to which a current is supplied are rotated in a circumferential direction, attraction force acts on the permanent magnets 6 due to magnetism induced by the solenoids 7. The permanent magnets 6 rotate in synchronization with a rotation speed of the solenoids 7 to which the current is supplied.

(Driving of the Magnetic-Drive-Pulsation Motor)

A driving principle of the magnetic-drive-pulsation motor is described with reference to FIG. 8. Here, for ease of explanation, 2 poles of the permanent magnets and 6 slots of solenoid coils are used. The figure shows the case where the magnetic-drive-pulsation motor is driven by the 120-degree conduction method.

Figure 8:
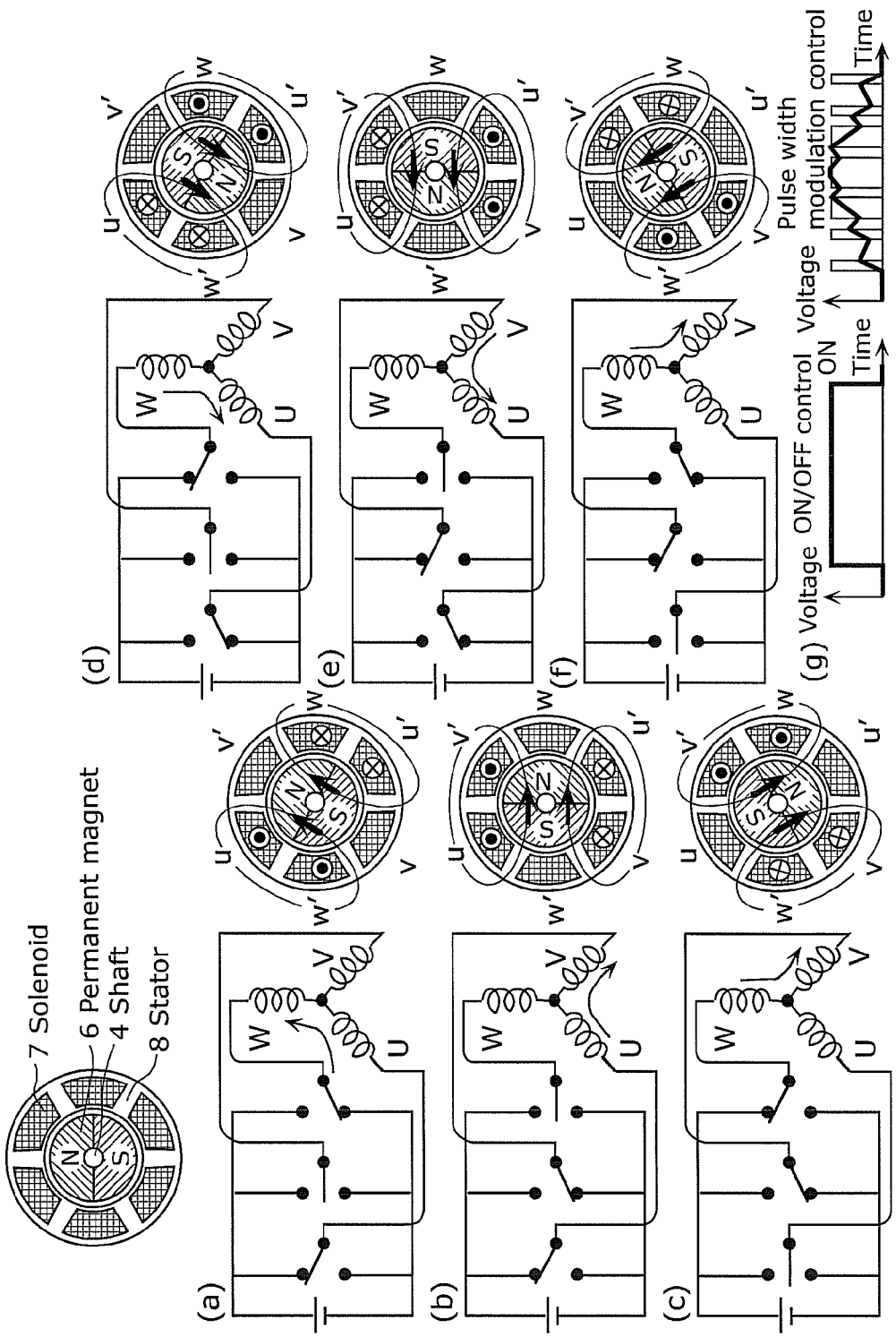
FIG. 8 is a diagram illustrating drive principle of a PM synchronous motor.

FIG. 8 shows circuit configuration for driving the magnetic-drive-pulsation motor.

As shown in the left of (a) in FIG. 8, when a U-phase is connected to a positive pole and a W-phase is connected to a negative pole, a current flows from the U-phase to the W-phase. In the solenoid at a position u, current flows in a forward direction with respect to the drawing. In the solenoid at a position w, a current flows in a backward direction with respect to the drawing. Thus, a magnetic field in the direction indicated by arrows in the right of (a) in FIG. 8 is generated. The permanent magnets rotate to a right direction by 30 degrees from a 0 o'clock position.

Next, as shown in the left of (b) in FIG. 8, when a V-phase is connected to the negative pole while the U-phase remains to be connected to the positive pole, a current flows from the U-phase to the V-phase. In the solenoid at the position u, current flows in a forward direction with respect to the drawing. In the solenoid at the position v, current flows in a backward direction with respect to the drawing. Thus, a magnetic field in the direction indicated by arrows in the right of (b) in FIG. 8 is generated, and the permanent magnets further rotate to the right by 60 degrees. In this way, by switching such that solenoids to which a current is supplied is switched from (c) in FIG. 8 to (f) in FIG. 8, the permanent magnets rotate about the shaft in a clockwise direction. The number of rotations can be controlled by a switching speed of switches.

A simple structure is used in FIG. 8 for the sake of description through, mechanism of rotation is substantially the same even when a larger number of solenoids and permanent magnet poles as shown in the cross-section view of the PM synchronous motor unit in FIG. 1B are used.

It is to be noted that the switches described in (a) to (f) in FIG. 8 are, in specific, formed using a semiconductor switch such as a power Metal Oxide Semiconductor (MOS) and an Insulated Gate Bipolar Transistor (IGBT). Use of a GaN power switch and SiC power switch that have high switching speed allows for higher pressure resistance.

In addition, FIG. 8 shows a method in which a current is supplied through ON/OFF control using switches. For quiet and smooth driving of the PM synchronous motor unit, sinusoidal wave driving is preferable. As shown in (g) in FIG. 8, pseudo-sinusoidal wave is generated using switches by repeating ON/OFF of switches in a short period of time during ON state of the ON/OFF control. Thus, a duty ratio is adjusted and thereby a Pulse Width Modulation (PWM) control which generates pseudo-sinusoidal wave is performed.

Following describes the driving of the magnetic-drive-pulsation motor according to Embodiment 1.

FIG. 1B shows a cross-section view of the PM synchronous motor unit 1. To the solenoids 7 in the PM synchronous motor unit 1, a pulse width modulated current of about 20 kHz is supplied so that the solenoids 7 are magnetized. Then, in the same manner as the driving method shown in FIG. 8, the solenoids 7 to which a current is supplied is switched. According to a magnetic field generated by the magnetized solenoid, the rotor 3 is rotated. The PM synchronous motor unit 1 according to this embodiment has 12 slots-8 poles structure.

In the same manner as the rotor 3, the N-pole of magnetic core 10 and the S-pole of magnetic core 11 that are connected (fixed) to the shaft 4 also rotate.

As shown in FIG. 1C, when the S-pole of outer magnet 9 and the N-pole of magnetic core 10 are closest, a force of attraction and repulsion becomes equal and the torque in a rotating direction becomes zero. Subsequently, when the magnetic cores rotate to a right and the S-pole of magnetic core 11 comes close to the S-pole of outer magnet 9, repulsion is generated and thus the torque in the rotating direction takes a negative value. When the S-pole of outer magnet 9 and the S-pole of magnetic core 11 are closest, a force of attraction and repulsion becomes equal and thus torque in a rotating direction becomes zero. Furthermore, when the S-pole of outer magnet 9 and the N-pole of magnetic core 10 are getting closer, attraction is generated. With the above, the pulsator unit can modulate the torque.

When the MP motor according to this embodiment is driven using a matrix converter that operates on a single-phase 100 V, driving in a range of a several to 1000 rpm of output rotation number is possible. Furthermore, the MP motor according to the present invention is stable having no change in number of rotations even when driven using an inverter without smoothing circuit that operates on the single-phase 100 V.

The number of rotations outputted is considered to be determined only by a clock signal generated by an oscillator. Further, the MP motor according to the present invention does not generate vibration and can provide high output torque with a little fluctuation, and thus is proved to be a motor having high output energy efficiency with respect to input power supply.

Conventionally, there has been a problem of large motor vibration at about 1000 rpm or higher when a motor that is for a ventilating fan or the like is driven using a matrix converter that operates on the single-phase 100 V. Vibration of 100 Hz is observed when a frequency of AC 100 V is 50 Hz, and 120 Hz is observed when the frequency is 60 Hz. When the MP motor according to this embodiment is driven, no particular vibration is observed up to 1000 rpm.

From the above, it is found that the motor vibration that is generated at about 1000 rpm when the motor is driven using the matrix converter on single-phase 100 V is caused by a variation in torque. The variation in torque is caused by a presence of a zero crossing of a power supply. Consequently, it is found that motor driving without vibration up to 1000 rpm can be achieved by adding the pulsator unit to give the shaft 4 a slight torque modulation component and modulating the torque to mitigate deceleration at the zero crossing. This is because, synchronizing to a time when the PM synchronous motor unit is in deceleration state due to a drop in voltage at the zero crossing, the pulsator unit accelerates due to the force of attraction that acts on the N-pole of magnetic core coming closer to the S-pole of outer magnet. The deceleration caused by the drop in voltage is thus mitigated and a stable rotation is achieved.

Furthermore, a structure in FIG. 1D includes 4 poles. With this, a direction of mechanical vibration caused by torque modulation component generated in the pulsator unit can be symmetrical with respect to the shaft 4. This enables suppression of wearing and deterioration of the shaft. Furthermore, variation caused by a fluctuation of a shaft is mitigated, and more stable rotation as compared to a structure in FIG. 1C can be achieved.

Embodiment 2

Figure 2A:
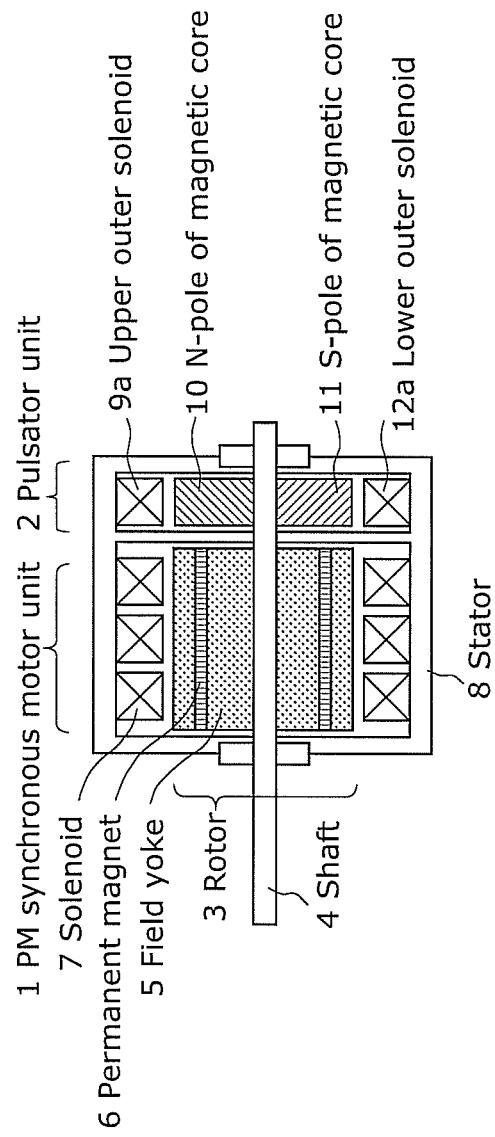
FIG. 2A and FIG. 2B are cross-section views of a magnetic-drive-pulsation motor according to Embodiment 2 of the present invention.
Figure 2B:
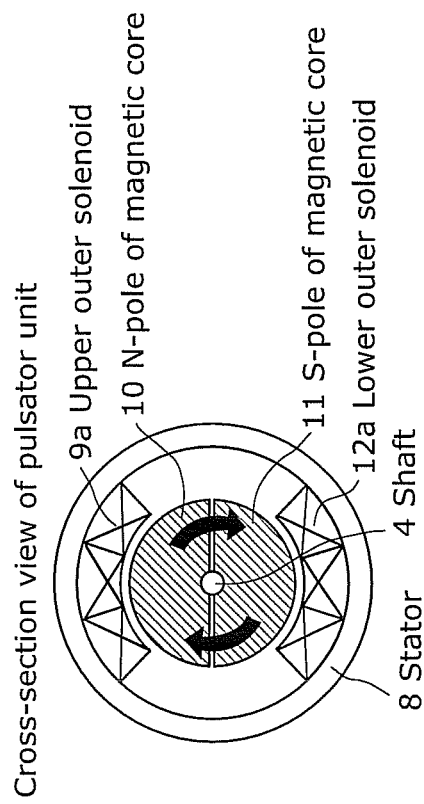

Following describes a magnetic-drive-pulsation motor according to Embodiment 2 with reference to FIG. 2A and FIG. 2B.

In FIG. 2A and FIG. 2B, a component having the same reference sign as the magnetic-drive-pulsation motor according to Embodiment 1 has the same function and thus a description thereof is omitted.

The magnetic-drive-pulsation motor according to Embodiment 2 is different from the magnetic-drive-pulsation motor according to Embodiment 1 in that the pulsator unit 2 has, instead of the S-pole of outer magnet 9 and the N-pole of outer magnet 12, an upper outer solenoid 9a and a lower outer solenoid 12a.

Figure 3A:
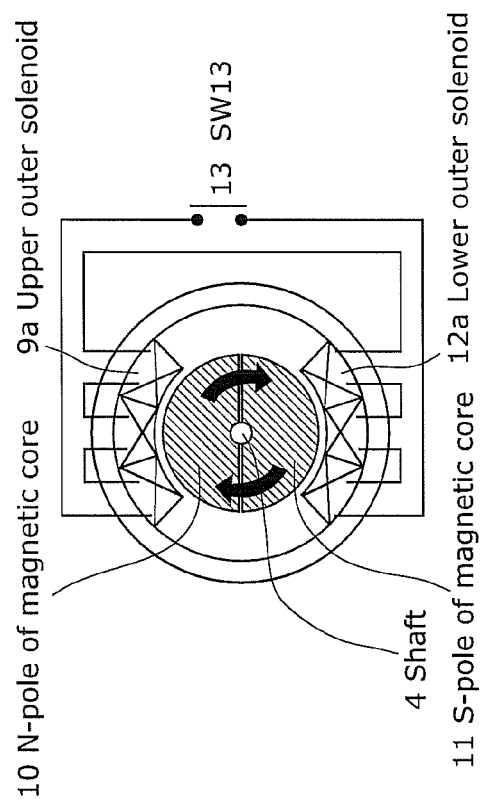
FIG. 3A to FIG. 3E are diagrams illustrating how a magnetic-drive-pulsation motor according to Embodiment 2 of the present invention is driven.

As shown in FIG. 3A, the upper outer solenoid 9a and the lower outer solenoid 12a are electrically connected via a semiconductor switch (SW) 13. Furthermore, the electrical connection is made such that a direction of induced current that are generated around the upper outer solenoid 9a and the lower outer solenoid 12a aligns.

Following describes an operation of the magnetic-drive-pulsation motor according to Embodiment 2.

When the PM synchronous motor unit 1 rotates, magnetic cores (an N-pole of magnetic core 10 and an S-pole of magnetic core 11) that are connected to the PM synchronous motor unit 1 by the shaft 4 also rotate, and a center portion of the N-pole of magnetic core 10 comes close to the upper outer solenoid 9a. When the magnetic core comes close to the solenoid, induced current flows in the solenoid and repulsion is generated in the magnetic core.

Here, because the upper outer solenoid 9a and the lower outer solenoid 12a are electrically connected such that a direction of generated induced current aligns, a circulating current flows. Normally, the semiconductor switch 13 is turned ON so that the upper outer solenoid 9a and the lower outer solenoid 12a are electrically connected to allow the induced current to flow. When the magnetic cores come close to the solenoids, an induced current flows in the solenoids such that an increase of magnetic lines is prevented. Thus, the upper outer solenoid 9a forms the N-pole and the lower outer solenoid 12a forms the S-pole.

Next, when the magnetic cores move away from the solenoids, an induced current of reverse direction attempts to flow. However, since the solenoids have a large inductance component, reversing of induced current is less likely to occur, and the upper outer solenoid 9a remains to be the N-pole and the lower outer solenoid 12a remains to be the S-pole.

Consequently, repulsion is generated between the solenoids and the magnetic cores, and the torque that enables the continuous rotation of the motor is generated. Therefore, even when a matrix converter and an inverter without smoothing circuit that operate on single-phase 100 V are used, pulsation caused by reduced rotations and reduced torque of the motor is not generated, and the motor keeps rotating.

Figure 3B:
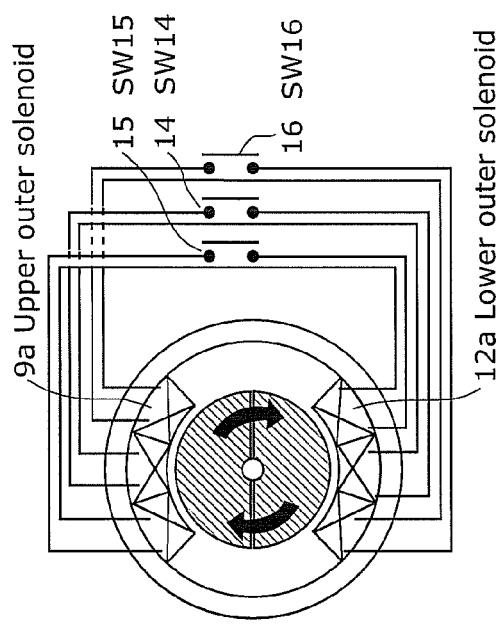
Figure 3C:
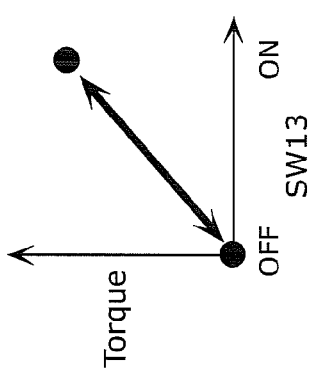
Figure 3D:
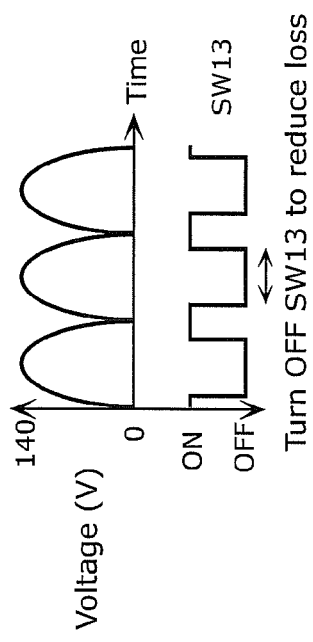

On the other hand, as shown in FIG. 3C, when the semiconductor switch 13 is turned OFF, an induced current does not flow in the outer solenoid. Thus, torque becomes zero and the torque modulation does not occur. As shown in FIG. 3D, at other times than when supply voltage is around the zero crossing, the semiconductor switch 13 is turned OFF. This enables to reduce a loss in motor attributed to current loss caused by conduction resistance in the solenoid and the semiconductor switch.

Figure 3E:
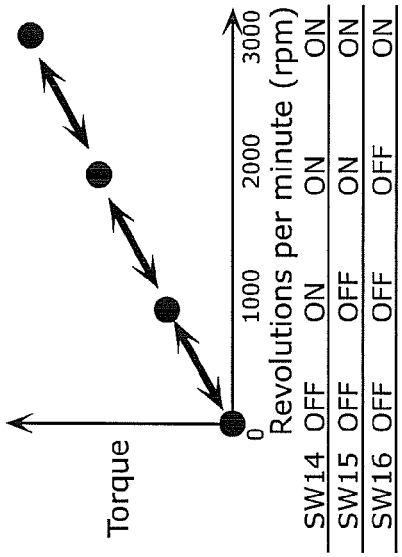

On the other hand, as shown in FIG. 3B, a plurality of the upper outer solenoids 9a and the lower outer solenoids 12a are electrically connected via individual semiconductor switches 14, 15, and 16 respectively. In this case, as shown in FIG. 3E, torque can be changed by the number of semiconductor switches to be turned ON. A direction of induced current is determined such that a circulating current flows between each of the upper outer solenoids 9a and the lower outer solenoids 12a which are connected to each other. The pulsation of the PM synchronous motor becomes more significant as the number of rotations is increased. Thus, a large number of rotations requires a large torque modulation. As shown in FIG. 3E, excessive torque modulation is suppressed by turning ON the smaller number of switches when the rpm is low. In contrast, large torque modulation is provided by turning ON the larger number of semiconductor switches at 1000 rpm or higher at which the large vibration of the PM synchronous motor occurs. When the MP motor according to this embodiment is driven, no particular motor vibration is observed up to 3000 rpm.

Following describes a drive circuit according to this embodiment.

Figure 9A:
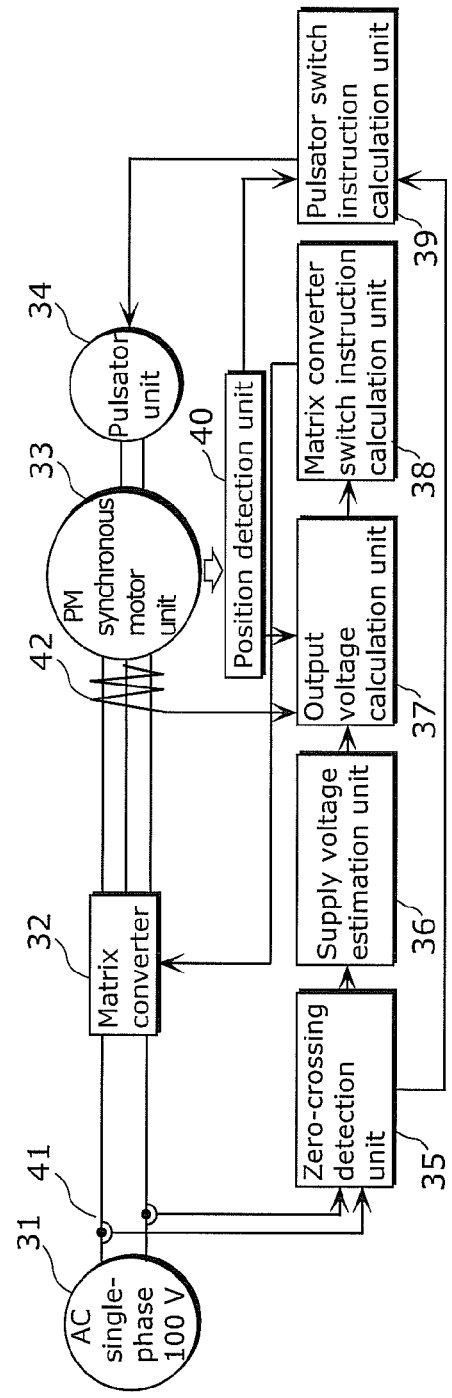
FIG. 9A to FIG. 9D are diagrams illustrating a driving circuitry of a matrix converter system and how the matrix converter system operates.

FIG. 9A shows a matrix converter system which includes: an AC single-phase 100 V power supply 31, a matrix converter 32, a PM synchronous motor unit 33, and a pulsator unit 34. Conventional converter system converts commercial power into DC power once with a rectifier, and then converts again the DC power into desired AC power by an inverter. For this, a smoothing capacitor needs to be connected between the rectifier and the inverter so that direct-current portion is stabilized. In contrast, the matrix converter 32 in FIG. 9A directly converts AC power of a constant frequency supplied from the AC single-phase 100 V power supply 31 into AC power of desired frequency. The matrix converter 32 does not require the AC power to be converted into the DC power, allowing the elimination of the smoothing capacitor required by the conventional converter. This enables a downsizing of the device and elimination of a periodic replacement of the capacitor, and thus an advantage in terms of maintenance is significant. Furthermore, electric power regeneration and power supply harmonic reduction are also possible.

First, a drive circuit of the PM synchronous motor unit is described. A supply voltage detector 41 is a device which detects a supply voltage and transmits the detected supply voltage to a zero crossing detection unit 35. The supply voltage detector 41 is implemented through division of a voltage by a resistor and using a voltage detection unit such as a transformer. Furthermore, although a voltage of each phase is detected in FIG. 9A, a line-to-line voltage detection is also acceptable.

A control circuit includes: the zero crossing detection unit 35, a supply voltage estimation unit 36, an output voltage calculation unit 37, and a matrix converter switch instruction calculation unit 38. The control circuit calculates an instruction value for causing a bidirectional switch that forms the matrix converter 32 to be turned ON/OFF.

First, based on the voltage information detected by the supply voltage detector 41, the zero crossing detection unit 35 detects a zero crossing of a supply voltage. With this, the point at which a voltage of each phase of power supply shifts from a positive to a negative or a negative to a positive is detected. The zero crossing is detected by a comparator that uses an operational amplifier or the like. Next, the supply voltage estimation unit 36 calculates a supply voltage estimation value. The calculation is performed using a microcomputer or the like. With the zero crossing that is detected by the zero-crossing detection of the supply voltage as a start point, a voltage value and a phase of the supply voltage is calculated using a timer or the like. Next, an intake of supply voltage is performed according to interrupts and so on such as the generation of an instruction value for the matrix converter 32. The supply voltage detector 41 detects the voltage. After the A/D conversion or the like is performed, the voltage is fed to the microcomputer.

Next, an output voltage instruction value calculated by the output voltage calculation unit 37 is directly supplied to the matrix converter switch instruction calculation unit 38. The output voltage instruction value is calculated based on the supply voltage estimation value, an output current value 42, and a position signal on a load of the motor or the like that is provided by a position detector 40. The matrix converter switch instruction calculation unit 38 generates an output instruction value of the bidirectional switch that forms the matrix converter, by performing processing such as a triangular-wave comparison or the like.

Following describes a drive circuit of the pulsator unit. Based on the zero crossing detection unit 35, drop in supply voltage is detected. As shown in FIG. 3D, when a difference in supply voltage becomes 50 V or smaller, a pulsator switch instruction calculation unit issues an instruction for turning ON the semiconductor switch 13 in the pulsator unit 34. When the difference in supply voltage becomes greater than 50 V, the semiconductor switch 13 in the pulsator unit 34 is turned OFF. This enables to suppress a loss caused by a copper loss generated in the pulsator and internal resistance of the switch.

Furthermore, in the case of the magnetic-drive-pulsation motor having a structure shown in FIG. 3B, rpm is calculated based on the data from the position detector 40, and the switches 14 to 16 in the pulsator unit 34 are turned ON/OFF as shown in FIG. 3E such that the torque suitable for the rpm is obtained.

It is to be noted that, when the induced current is turned OFF, a large voltage is generated in the semiconductor switch. Thus, pressure resistance needs to be carefully selected for a semiconductor switch. Thus, it is preferable that the semiconductor switch include a nitride semiconductor, especially a GaN-based Field Effect Transistor (FET), or a semiconductor which includes silicon carbide or diamond so that high pressure resistance is achieved. The above applies to the following embodiments as well.

Embodiment 3

When a frequency of a single-phase 100 V power supply is 60 Hz and the motor rotates at 1800 rpm, zero-crossings of the supply voltage occur with the same magnetic core position.

Figure 4A:
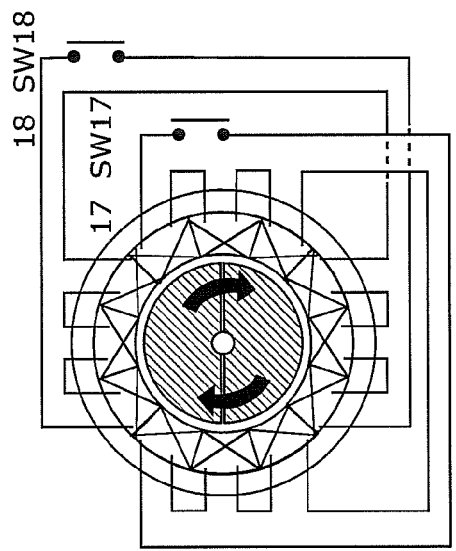
FIG. 4A to FIG. 4D are cross-section views of a magnetic-drive-pulsation motor according to Embodiment 3 of the present invention and diagrams illustrating how the magnetic-drive-pulsation motor is driven.

According to Embodiment 2, there may be a case where synchronization occurs such that a zero crossing always occurs when the magnetic cores come close to the outer solenoids. In this case, a torque of the PM synchronous motor unit becomes zero while a maximum repulsion acts between the solenoids and the magnetic cores. Thus, there may be a case where pulsation is generated due to the reduced rotations and reduced torque of a motor. In view of the above, solenoids to which an induced current is caused to flow are made selectable so that the zero crossing never occurs when magnetic cores come close to outer solenoids. Following describes a magnetic-drive-pulsation motor according to Embodiment 3 with reference to FIG. 4A.

Embodiment 3 is different from Embodiment 1 and Embodiment 2 in that a pulsator unit 2 has solenoids that are arranged over an entire region of the pulsator unit 2. Electrical connection of upper and lower solenoids is controlled by a semiconductor switch 17. Electrical connection of right and left solenoids is controlled by a semiconductor switch 18. Electrical connections are made via the semiconductor switches 17 and 18 such that induced current of the upper and lower outer solenoids and the right and left outer solenoids circulate as circulating current. As shown in FIG. 4C, when the number of rotations of the motor synchronizes in a way that the zero crossing occurs when the magnetic cores come close to the upper and the lower outer solenoids, the semiconductor switch 17 is turned OFF and the semiconductor switch 18 is turned ON. With this, even when a matrix converter and an inverter without smoothing circuit that operate on single-phase 100 V are used, pulsation caused by reduced rotations and reduced torque of the motor is not generated, and the motor keeps rotating.

Following describes a drive circuit according to this embodiment.

Figure 9B:
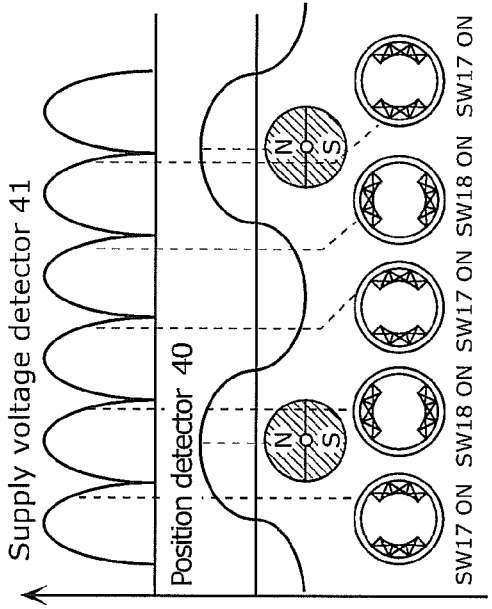
Figure 9C:
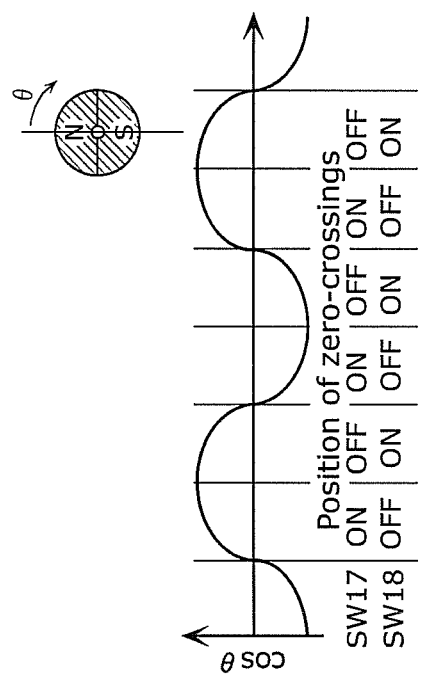

In a matrix converter system shown in FIG. 9A, a position detector 40 detects a rotation angle of the motor at which a supply voltage becomes 50% or smaller based on a supply voltage detector 41. A pulsator switch instruction calculation unit 39 receives the result from the position detector 40 and determines whether to turn ON the semiconductor switch 17 or to turn ON the semiconductor switch 18 as shown in FIG. 9B. The switch to be turned ON is selected such that positive torque is generated at the zero crossing. In this embodiment, as shown in FIG. 9C, when it is assumed that a rotation angle of the magnetic cores at the zero-crossing is $\theta$ and a $\cos \theta$ is changed from 0 to 1 and 0 to −1, the semiconductor switch 17 is turned ON and the semiconductor switch 18 is turned OFF. On the other hand, when the $\cos \theta$ is changed from 1 to 0 and −1 to 0, the semiconductor switch 17 is turned OFF and the semiconductor switch 18 is turned ON. As shown in FIG. 9B, the switch is turned ON when the supply voltage becomes 50 V or smaller. This is necessary to generate force of attraction by causing a current to flow in the solenoid before the supply voltage reaches 0 V.

Embodiment 4

A solenoid in which an induced current is caused to flow is made selectable individually so that a zero crossing does not occur when magnetic cores come close to outer solenoids.

Figure 4B:
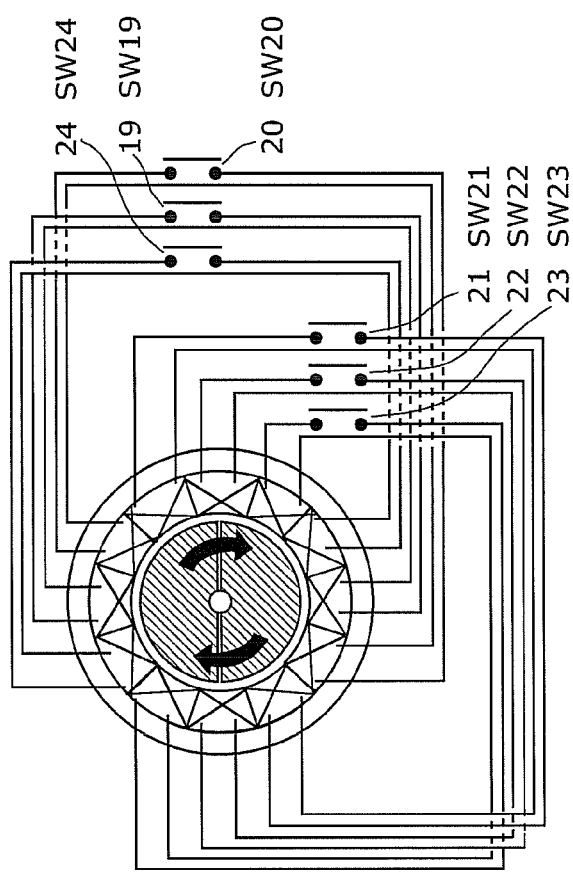
Figure 4C:
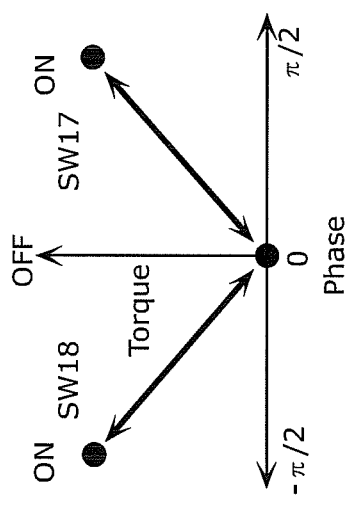

Following describes a magnetic-drive-pulsation motor according to Embodiment 4 with reference to FIG. 4B. A solenoid is divided into 12 portions and each of solenoids is electrically connected to a solenoid located at a diagonal position across a shaft such that a circulating current is formed. With this, a rotational phase of a motor can be controlled by 30 degrees. By turning ON the solenoid located at a position where a positive torque is generated at a zero-crossing, pulsation caused by reduced rotations and reduced torque of the motor is not generated, and the motor keeps rotating.

Following describes a drive circuit according to this embodiment.

Figure 9D:
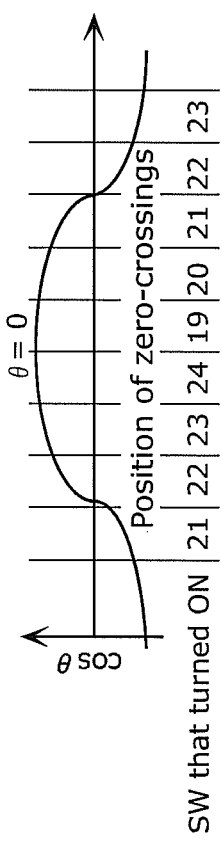

In a matrix converter system shown in FIG. 9A, a position detector 40 detects a rotation angle of the motor at which a supply voltage becomes 50% or smaller based on a supply voltage detector 41. A pulsator switch instruction calculation unit 39 receives the result from the position detector 40 and determines a switch to be turned ON from among the switches shown in FIG. 4B. The switch to be turned ON is selected such that positive torque is generated at the zero crossing. In this embodiment, as shown in FIG. 9D, a SW19 is turned ON when a rotation angle $\theta$ of magnetic cores when the zero-crossing occurs is 0 to 30 degrees and a SW20 is turned ON when the $\theta$ is 30 to 60 degrees. Likewise, control is performed such that a switch shown in FIG. 9D is turned ON according to a rotation angle. In addition, the switch is turned ON when the supply voltage becomes 50 V or smaller.

Figure 4D:
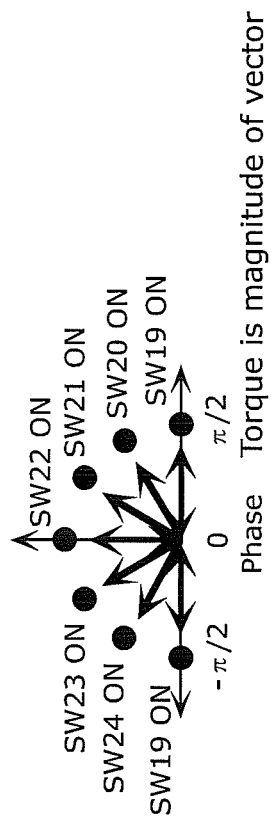
Figure 5:
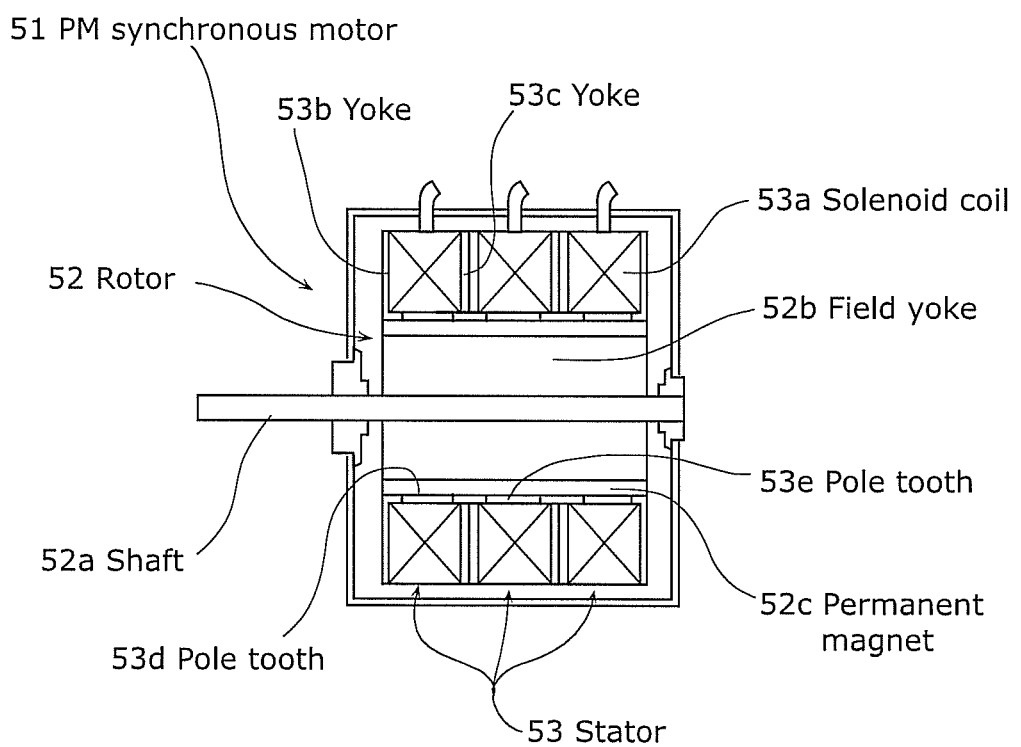
FIG. 5 is a cross-section view of a conventional PM synchronous motor.
Figure 6:
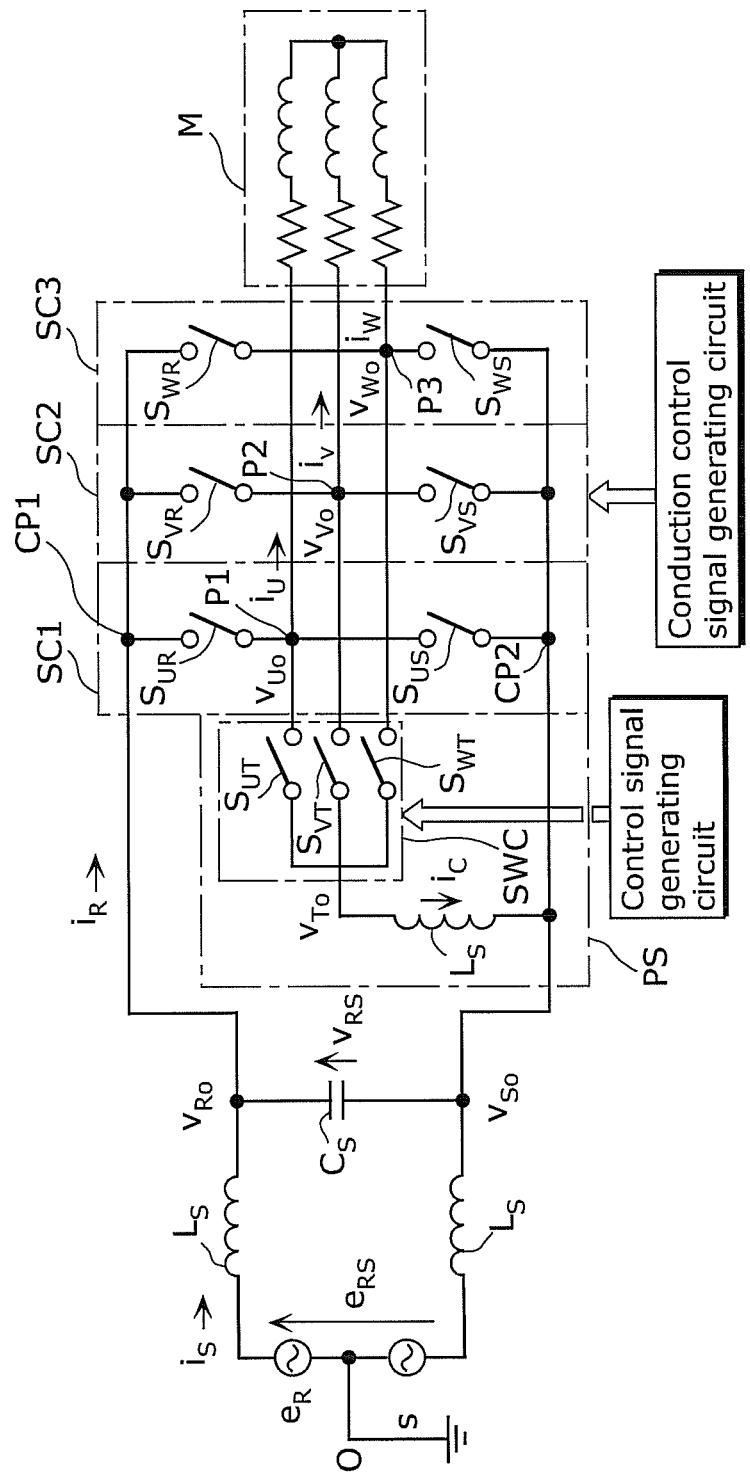
FIG. 6 is a cross-section view of a bypass for driving a conventional inverter.
Figure 7A:
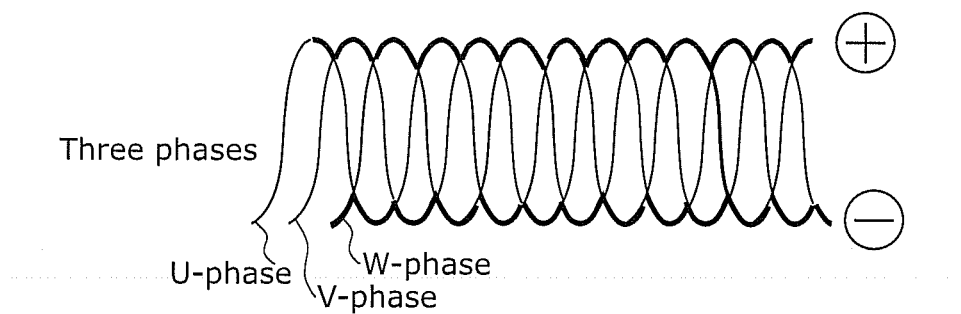
FIG. 7A and FIG. 7B are diagrams illustrating conventional envelopes of a single-phase AC and a three-phase AC.
Figure 7B:
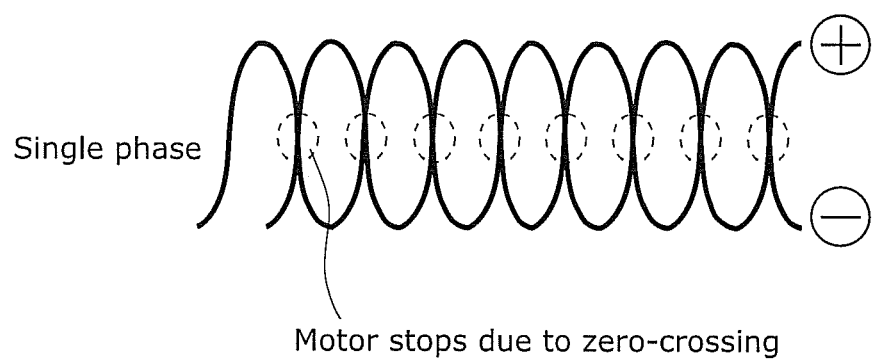

Further, there is a special controlling method. As shown in FIG. 4D, when the motor speed is 1200 rpm, the zero-crossing of supply voltage occurs at the position where the magnetic cores come close to every other solenoid. In this case, the solenoids that come closest at the zero-crossing and the every other solenoid are turned OFF (for example, SW19, SW21, and SW23 are turned OFF) and other solenoids are turned ON (SW20, SW22, and SW24 are turned ON). With this, it is possible to prevent the torque of the PM synchronous motor unit from becoming zero when the maximum repulsion acts between the solenoids and the magnetic cores.

With this, even when the matrix converter and the inverter without smoothing circuit that operate on single-phase 100 V are used, pulsation caused by reduced rotations and reduced torque of the motor is not generated, and the motor keeps rotating.

It is to be noted that although the PM synchronous motor (brushless DC motor) is used in the motor unit included in the MP motor according to the present invention, any AC motor that can be operated by a matrix converter may be used. However, the PM synchronous motor allows for a simple motor structure and that more and more PM synchronous motors are beginning to be included in a large motor.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention provides a motor that can eliminate the problem of a pulsation caused by reduced rotations and reduced torque of the motor even when using an inverter without smoothing circuit and a matrix converter using a single-phase, 100 V power supply, and which can be driven using a simple control device. This enables the conventional inverter without smoothing circuit and the matrix converter that are for brushed motor to be used to drive a brushless DC motor. Since it is sufficient to replace only the motor portion, replacement of the drive portion becomes unnecessary, and thus replacement from a brushed motor included in a conventional device to a brushless motor becomes easy.

What is claimed is:
1. A magnetic-drive-pulsation motor comprising:
a Permanent Magnet (PM) synchronous motor unit;
a pulsator unit; and
a control circuit, wherein said PM synchronous motor unit includes (i) a rotor including permanent magnets and (ii) a stator including solenoid coils, said pulsator unit includes magnetic cores and outer solenoids, said rotor and said magnetic cores are connected together by a shaft, said outer solenoids are connected to said stator, said magnetic cores are disposed such that an N-pole and an S-pole face each other across the shaft, said outer solenoids are disposed over an entire region of said stator, and said outer solenoids that are adjacent to each other or said outer solenoids that face each other across said magnetic cores are electrically connected to each other via semiconductor switches such that an induced current circulates as a circulating current, and said control circuit includes:

a supply voltage detector that detects a supply voltage;

a matrix converter that performs AC-AC conversion on the supply voltage;

a zero crossing detection unit configured to detect a zero crossing of the supply voltage detected by said supply voltage detector; and a pulsator switch instruction calculation unit configured to issue (i) an instruction for turning ON only a semiconductor switch included in the semiconductor switches which corresponds to a closest one of said outer solenoids at the zero crossing detected by said zero crossing detection unit, when the supply voltage detected by said supply voltage detector falls at or below a half of a single-phase voltage of 100 volts, and (ii) an instruction for turning OFF all the semiconductor switches, when the supply voltage detected by said supply voltage detector exceeds the half of the single-phase voltage of 100 volts.

2. The magnetic-drive-pulsation motor according to claim 1, wherein said matrix converter includes a bidirectional switch.

3. The magnetic-drive-pulsation motor according to claim 1, wherein each of the semiconductor switches includes a nitride semiconductor or a semiconductor that includes silicon carbide or diamond.

4. A magnetic-drive-pulsation motor comprising:

a Permanent Magnet (PM) synchronous motor unit;

a pulsator unit; and a control circuit, wherein said PM synchronous motor unit includes (i) a rotor including permanent magnets and (ii) a stator including solenoid coils, said pulsator unit includes magnetic cores and outer solenoids, said rotor and said magnetic cores are connected together by a shaft, said outer solenoids are connected to said stator, said magnetic cores are disposed such that an N-pole and an S-pole face each other across the shaft, six outer solenoids including said outer solenoids are disposed in said stator, (i) each of said outer solenoids that face each other across said magnetic cores is electrically connected via a semiconductor switch to one of said outer solenoids that face each other such that an induced current circulates as a circulating current, and (ii) each of said outer solenoids that are adjacent to each other is not electrically connected to one of said outer solenoids that are adjacent to each other, said control circuit includes:

a supply voltage detector that detects a supply voltage;

a matrix converter that performs AC-AC conversion on the supply voltage;

a zero crossing detection unit configured to detect a zero crossing of the supply voltage detected by said supply voltage detector; and a pulsator switch instruction calculation unit configured to issue (i) an instruction for turning ON only the semiconductor switch which corresponds to a closest one of said outer solenoids at a zero crossing for every 30 degrees of rotational phase of said PM synchronous motor unit, when the supply voltage detected by said supply voltage detector falls at or below a half of a single-phase voltage of 100 volts, and (ii) an instruction for turning OFF all semiconductor switches including the semiconductor switch, when the supply voltage detected by said supply voltage detector exceeds the half of the single-phase voltage of 100 volts.

5. The magnetic-drive-pulsation motor according to claim 4, wherein said matrix converter includes a bidirectional switch.

6. The magnetic-drive-pulsation motor according to claim 4, wherein the semiconductor switch includes a nitride semiconductor or a semiconductor that includes silicon carbide or diamond.

7. A magnetic-drive-pulsation motor comprising:

a Permanent Magnet (PM) synchronous motor unit;

a pulsator unit; and a control circuit, wherein said PM synchronous motor unit includes (i) a rotor including permanent magnets and (ii) a stator including solenoid coils, said pulsator unit includes magnetic cores and outer solenoids, said rotor and said magnetic cores are connected together by a shaft, said outer solenoids are connected to said stator, said magnetic cores are disposed such that an N-pole and an S-pole face each other across the shaft, said outer solenoids are disposed so as to face each other across said magnetic cores, (i) each of said outer solenoids that are adjacent to each other is electrically connected via a semiconductor switch to one of said outer solenoids that are adjacent to each other and (ii) each of said outer solenoids that face each other is electrically connected via a semiconductor switch to one of said outer solenoids that face each other such that induced current circulate as circulating current, said control circuit includes:

a supply voltage detector that detects the supply voltage;

a matrix converter that performs AC-AC conversion on the supply voltage;

a zero crossing detection unit configured to detect a zero crossing of the supply voltage detected by said supply voltage detector; and a pulsator switch instruction calculation unit configured to issue (i) an instruction for turning ON a semiconductor switch included in the semiconductor switches, when the supply voltage detected by said supply voltage detector falls at or below a half of a single-phase voltage of 100 volts, and (ii) an instruction for turning OFF all semiconductor switches including the semiconductor switch, when the supply voltage detected by said supply voltage detector exceeds the half of the single-phase voltage of 100 volts.

8. The magnetic-drive-pulsation motor according to claim 7, wherein said matrix converter includes a bidirectional switch.

9. The magnetic-drive-pulsation motor according to claim 7, wherein the semiconductor switch includes a nitride semiconductor or a semiconductor that includes silicon carbide or diamond.

* * * * *